US008262063B2

(12) United States Patent
Jacobs

(10) Patent No.: US 8,262,063 B2
(45) Date of Patent: Sep. 11, 2012

(54) TOOL WITH HYDRAULIC VALVE SYSTEM

(75) Inventor: Adrianus Cornelis Maria Jacobs, Bosschenhoofd (NL)

(73) Assignee: B.V. Holmatro Industrial Equipment, Vx Raamsdonksveer (NL)

( * ) Notice: Subject to any disclaimer, the term of this patent is extended or adjusted under 35 U.S.C. 154(b) by 832 days.

(21) Appl. No.: 11/919,316

(22) PCT Filed: Apr. 28, 2006

(86) PCT No.: PCT/NL2006/000227
§ 371 (c)(1),
(2), (4) Date: Aug. 15, 2008

(87) PCT Pub. No.: WO2006/115407
PCT Pub. Date: Nov. 2, 2006

(65) Prior Publication Data

US 2009/0045384 A1 Feb. 19, 2009

(30) Foreign Application Priority Data

Apr. 28, 2005 (NL) ..................................... 1028901

(51) Int. Cl.

| | |
|---|---|
| ***A62B 3/00*** | (2006.01) |
| ***B66F 3/24*** | (2006.01) |
| ***B66F 7/10*** | (2006.01) |
| ***B66F 7/12*** | (2006.01) |
| ***B66F 3/42*** | (2006.01) |
| ***E21D 15/44*** | (2006.01) |
| ***F16D 31/02*** | (2006.01) |
| ***B26B 11/00*** | (2006.01) |
| ***B26B 1/00*** | (2006.01) |
| ***B26B 3/00*** | (2006.01) |
| ***B25F 3/00*** | (2006.01) |
| ***B25B 11/00*** | (2006.01) |

(52) U.S. Cl. .................. 254/93 R; 254/89 H; 254/93 H; 60/484; 30/134

(58) Field of Classification Search ................ 254/93 R, 254/89 H, 93 H, 104; 60/484, 473, 545; 30/124, 228, 180
See application file for complete search history.

(56) References Cited

U.S. PATENT DOCUMENTS 3,762,688 A * 10/1973 Leonhardt .................. 254/93 R
(Continued)

FOREIGN PATENT DOCUMENTS

DE 19512429 10/1996
(Continued)

OTHER PUBLICATIONS

PCT International Search Report, Jul. 19, 2006.

*Primary Examiner* — Lee D Wilson
*Assistant Examiner* — Alvin Grant
(74) *Attorney, Agent, or Firm* — Nath, Goldberg & Meyer

(57) ABSTRACT

The invention relates to a hydraulic tool, in particular a rescue tool, provided with pivotable parts and with a hydraulic valve system having a double-action hydraulic cylinder connected thereto for driving the pivotable parts, wherein the hydraulic valve system comprises: —a differential valve element (K-7) for providing an increased speed of the outward plunger stroke of the double-action cylinder in a first position and for providing a normal speed thereof in a second position, combined with; —pressure-controlled non-return valves (T-I, T-2) for blocking the plunger of the double-action cylinder when hydraulic pressure is lost.

11 Claims, 4 Drawing Sheets

U.S. PATENT DOCUMENTS

| | | | | | |
|---|---|---|---|---|---|
| 3,837,076 | A | * | 9/1974 | Good, Jr. | 30/180 |
| 3,898,805 | A | * | 8/1975 | Good, Jr. | 60/325 |
| 4,041,840 | A | * | 8/1977 | Zirps | 91/416 |
| 4,392,263 | A | * | 7/1983 | Amoroso | 7/100 |
| 4,531,289 | A | * | 7/1985 | Brick | 30/134 |
| 4,608,945 | A | * | 9/1986 | Yastrebov | 122/407 |
| 4,635,754 | A | * | 1/1987 | Aschauer et al. | 182/3 |
| 4,734,983 | A | * | 4/1988 | Brick | 30/228 |
| 4,771,221 | A | * | 9/1988 | Finkbeiner | 318/41 |
| 4,803,840 | A | * | 2/1989 | Seibert et al. | 60/545 |
| 5,105,543 | A | * | 4/1992 | Maarschalk et al. | 30/228 |
| 5,105,622 | A | * | 4/1992 | Lindner | 60/473 |
| 5,159,872 | A | * | 11/1992 | Dettmers et al. | 91/432 |
| 6,634,173 | B2 | * | 10/2003 | Linster et al. | 60/484 |
| 6,698,555 | B2 | * | 3/2004 | Schafer et al. | 188/170 |
| 6,840,497 | B2 | * | 1/2005 | Braun et al. | 251/129.03 |
| 7,409,828 | B2 | * | 8/2008 | Bertleff | 60/484 |
| 7,562,675 | B2 | * | 7/2009 | Nomichi et al. | 137/624.21 |
| 7,568,372 | B1 | * | 8/2009 | Patton et al. | 72/464 |
| 2011/0087337 | A1 | * | 4/2011 | Forsell | 623/23.68 |

FOREIGN PATENT DOCUMENTS

| | | |
|---|---|---|
| NL | 1002197 | 7/1997 |
| WO | WO 97/27901 | 8/1997 |

* cited by examiner

TOOL WITH HYDRAULIC VALVE SYSTEM

The invention relates to a hydraulic tool, in particular a rescue tool, provided with pivotable parts and with a hydraulic valve system having a double-action hydraulic cylinder connected thereto for driving the pivotable parts.

An example of such tool is a hydraulic spreader. This is understood to mean, among others, a spreader with more than sufficient spreading force to spread apart objects such as motor vehicles, trains, boats and the like, for instance in the case of vehicle accidents, search and rescue operations in an urban environment, industrial applications and rail accidents. In the case of hydraulic spreaders the pivotable parts (also referred to as arms) of the spreader are displaced by means of an externally or internally driven hydraulic cylinder, and a very great spreading force can hereby be exerted on the relevant object. Another example of such a tool is a hydraulic spreader jack with which parts of an object can be pressed apart.

In the case of for instance a hydraulic spreader such as is used by rescue services a valve system is used to control the pressure medium (for instance liquid such as oil) so that the spreader can exert force in order to press apart parts or pull them toward each other using chains and/or pulling aids. Safety is important in these applications since a load may not be allowed to move back, for instance due to the liquid pressure decreasing or even being lost. The plunger/piston in the cylinder may only be displaced if a conscious choice is made with the control of the spreader to lower a load.

In this type of tool pressure-controlled non-return valves are applied for this purpose which have the function of blocking the load in the case the liquid pressure is lost. These non-return valves can be pressed open by means of a small piston at sufficient pressure, thus providing for a controlled lowering of the load.

In addition to sufficient force, speed is also an important factor in such rescue tools. If a load to be spread apart already has something of an opening, the spreading arms must first open a little without load. This takes time, which a victim sometimes does not have. Rapid spreading of the arms until contact is made with the load is therefore a great advantage. The increasing strength of modern automobiles moreover requires increasingly more powerful tools, which are therefore becoming larger and heavier. The effective speed hereby decreases because the efficiency of the pumps is limited by weight and dimensions, and cannot therefore provide more pump volume.

So-called differential valves are per se known with which the speed of the outward plunger stroke of the double-action cylinder can be increased. Different configurations of such differential valves are known from “Hydraulik in Theorie und Praxis”, 1997, page 189 from Bosch Automationstechnik by Werner Götz.

The function of such a differential valve is to increase the speed of the outward plunger stroke of a double-action cylinder. For this purpose the volume of the liquid present above the piston of the plunger is added by means of one or more valves to the volume supplied under the piston. It will hereby be possible to pump out the plunger more rapidly.

A drawback of the known differential valves is the fact that the pressure force of the relevant double-action cylinder is greatly reduced because the pressure is equal on both sides of the piston and the effective force is therefore provided only by the area difference of the piston.

Both hydraulic valve systems, i.e. pressure-controlled non-return valves and differential valves, are however difficult to combine with each other because the functions can counteract each other. This is the reason that such a differential valve has never been applied in cylinders provided with pressure-controlled non-return valves for the purpose of blocking the load in the case the liquid pressure is lost.

It is an object of the invention to provide a tool, in particular a rescue tool, in which the above stated drawbacks of the prior art are obviated.

It is also an object of the invention to provide a tool, in particular a rescue tool, with which the speed can be increased without the function of blocking the load being counteracted, and the cylinder substantially retains its effective force.

The invention provides for this purpose a hydraulic tool, in particular a rescue tool, provided with pivotable parts and with a hydraulic valve system having connected thereto a double-action hydraulic cylinder for driving the pivotable parts, wherein the hydraulic valve system comprises:

- a differential valve element for providing an increased speed of the outward plunger stroke of the double-action cylinder in a first position and for providing a normal speed thereof in a second position; and
- pressure-controlled non-return valves for blocking the plunger of the double-action cylinder when hydraulic pressure is lost.

In the case of partial or complete loss of pressure the pressure-controlled non-return valves provide for blocking of the pivotable parts, while it is still possible to increase the speed of pivotable parts. It is hereby possible for the plungers of compact, lightweight, double-action hydraulic rescue tools to move more rapidly when non-loaded without a heavier pump being necessary with a greater oil delivery. The considerable gain in speed depends on the ratio of the piston area and can rise to 20%.

In a determined embodiment the differential valve element with which the speed of the plunger is increased can be manually operated. In another preferred embodiment however, the tool comprises a differential valve element automatically switched by pressure. The operative of the tool does not hereby need to perform any additional operations to increase or decrease the speed of the plunger. The differential valve element can herein comprise actuating means with which the differential valve element is automatically activated, wherein the actuating means are adapted to increase the speed of the outward plunger stroke only in the case of substantially non-loaded use. The speed is hereby only increased when the tool is used substantially when non-loaded, for instance during the initial phase of non-loaded opening of the spreading arms of a spreader tool, while the speed automatically acquires its original value when force is exerted on the arms. Incorrect operation of the tool by the operative, in particular a rescue worker, is hereby prevented.

According to a preferred embodiment, the tool comprises:

- a feed of hydraulic pressure medium;
- a discharge of hydraulic pressure medium;
- a first pressure conduit connected to a first chamber of the hydraulic cylinder and provided with a first pressure-controlled non-return valve;
- a second pressure conduit connected to the second chamber of the hydraulic cylinder and provided with a second pressure-controlled non-return valve;
- switch means for switching between a connection of the first and second pressure conduit to respectively the feed and the discharge and a connection of the first and second pressure conduit to respectively the discharge and feed. An example of such switch means is formed by a three-position four-way valve, wherein the four-way valve is adapted to provide, in a neutral position, an open connection of the pressure conduits to the feed and discharge, to provide in a second position a connection of the first and second pressure conduit to respectively the feed and the discharge, and to provide in a third position a connection of the first and second pressure conduit to respectively the discharge and feed.

The non-return valves mentioned here are of a type that is preferably provided with spring means for urging the valve to a closed position under a predetermined spring tension, so that the valve remains closed at relatively low pressure. The pressure in the pressure conduit must overcome said spring tension in order to open the non-return valve.

The pressure-controlled non-return valves mentioned here preferably comprise drive means for urging the valve to an open position subject to a preset pressure, so that the valve is opened counter to the spring tension subject to the pressure in the conduit to which the drive means are connected.

According to a preferred embodiment, the drive means comprise:

- a connecting line between a pressure conduit and a non-return valve in another pressure conduit;
- an operating element, such as a small hydraulic piston, which operating element is adapted to open the non-return valve in the other pressure conduit subject to the pressure in the pressure conduit.

In a further preferred embodiment the actuating means of the differential valve element comprise:

- a control pressure conduit connected to the feed;
- an actuating element which is connected to the control pressure conduit and with which the differential valve element can be placed in the first or second position subject to the pressure in the feed.

According to a further preferred embodiment, the tool comprises:

- a non-return valve arranged in the pressure conduit between the feed and the differential valve element;
- a non-return valve arranged in the pressure conduit between the switch means and the pressure-controlled non-return valve connected to the second chamber.

Further advantages, features and details of the present invention will be elucidated on the basis of the following description of several embodiments thereof. Reference is made in the description to the accompanying figures, in which.

In the diagrams used in the figures symbols are applied which are based on the European standard EN-ISO 1219-2 (1996), and their meaning may be assumed known to the skilled person.

Figure 1:
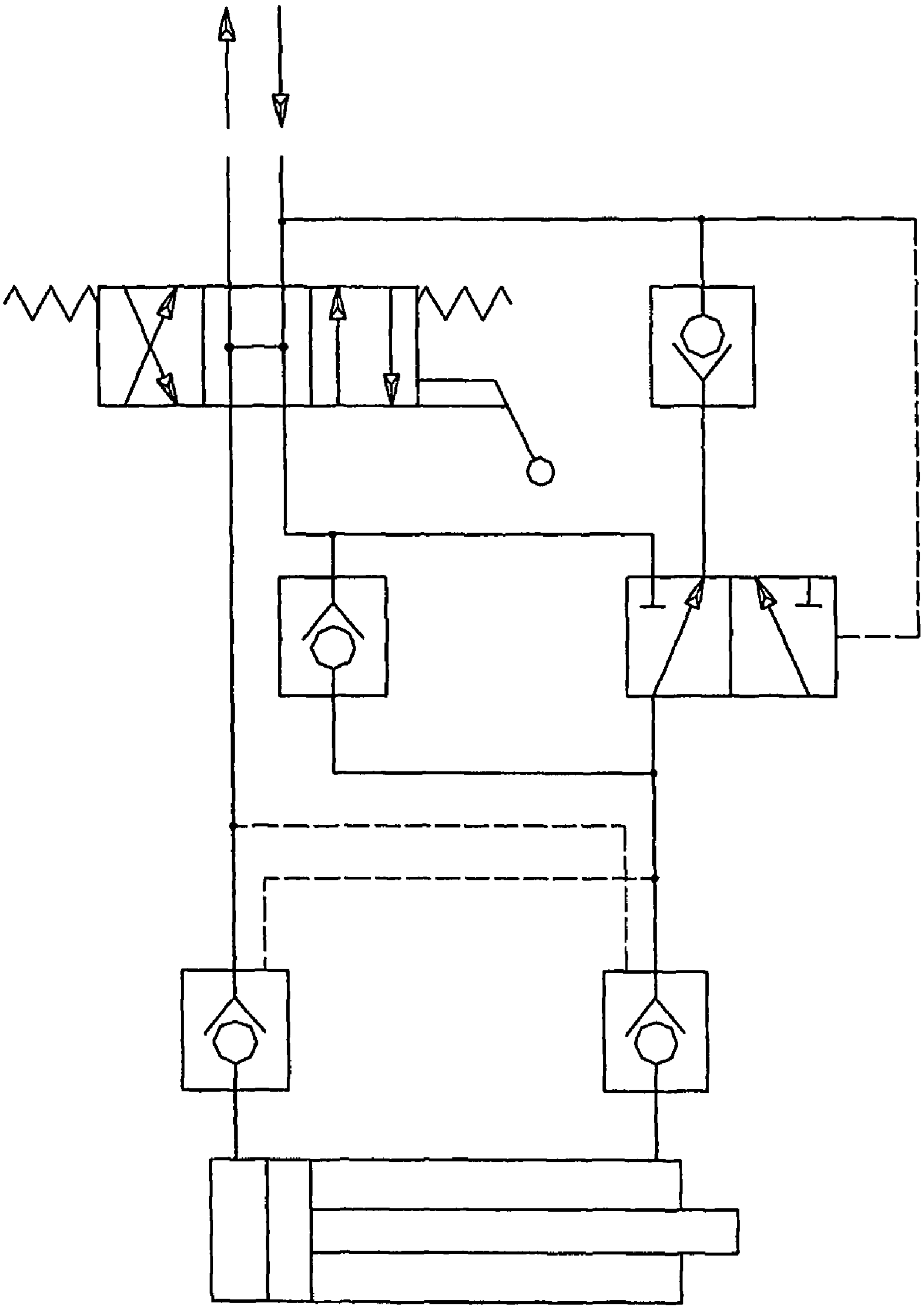
FIG. 1 shows a diagram of a preferred embodiment of a hydraulic valve system with double-action cylinder according to the present invention.

In the diagram shown in FIG. 1 there is placed after the switch valve or control valve, preferably a three-position four-way valve, an additional two-position three-way valve which is in turn connected via a non-return valve to the delivery channel. This additional valve is switched by the pressure in the delivery channel. When the piston is pumped out, the oil is guided to the underside of the piston. This will make the piston want to move. It must be possible for this purpose to drain the oil present on the upper side of the piston. The non-return valve in this channel is however closed. As a consequence pressure is created on the underside which then opens the above stated non-return valve via a drive piston. Now the oil can indeed escape and, via the two-position three-way valve and the non-return valve, this oil comes together again with the oil supplied by the pump so that a larger volume eventually goes to the cylinder.

As soon as the pressure in the delivery channel reaches a determined preset value it switches the two-position three-way valve. At that moment the oil flows directly to the port of the three-position four-way valve and, via this valve, back to the pump via the return conduit. In other words, as soon as pressure is developed, for instance when force must be exerted, the switch is rendered inoperative. This is because as soon as force is required, the speed must be lower in order to have more control over the movement.

Figure 2B:
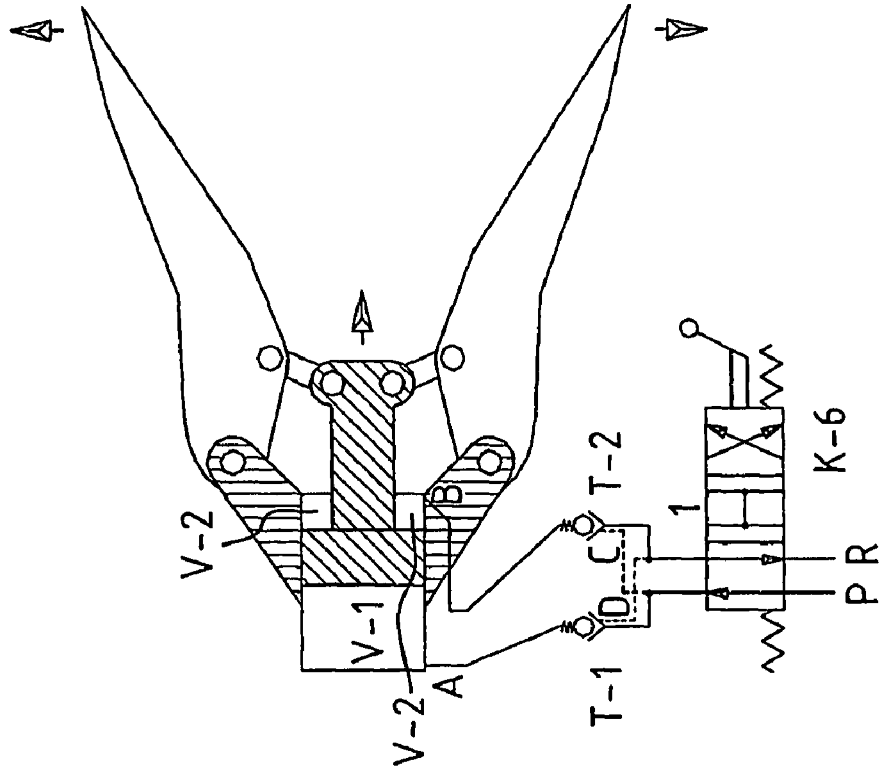
FIG. 2B shows a schematic representation corresponding to FIG. 2A in a spread position.
Figure 2A:
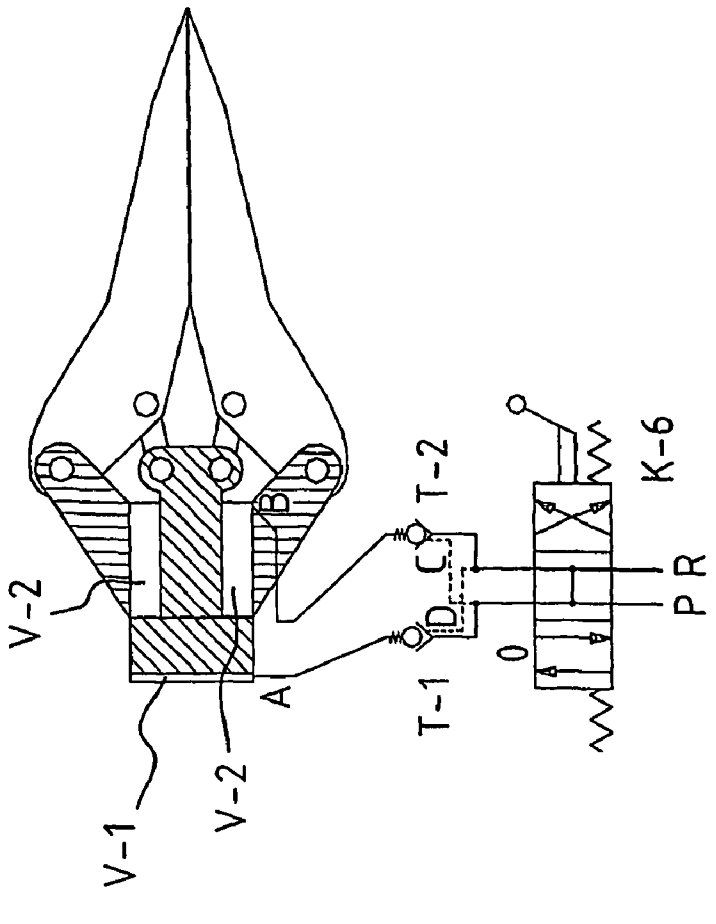
FIG. 2A is a schematic representation of a rescue tool without the automatic differential valves but with a hydraulic valve system which provides for blocking in the case of pressure loss in the neutral position (0-position)

FIGS. 2A and 2B show blocking of the tool when pressure is lost, i.e. when the pressure becomes so low or is completely lost that the load can no longer be supported. The control of the tool operates via a hand-operated valve K-6 which is always returned automatically to the 0-position by springs. This is the so-called dead man's control. The springs of the valve ensure that, if the operating means is released, the valve moves into the 0-position and all movement ceases immediately.

In the 0-position as shown in FIG. 2A the pressure medium can flow via P and non-return valve T-1 to port A of the cylinder. The volume V-2 cannot however exit because non-return valve T-2 is closed. The plunger/piston will therefore not move and the liquid flow at P will thus choose the path of least resistance and flow via port R back to the pump.

FIG. 2B shows what happens when valve K-6 is switched on, for instance to spread a load apart. The pressure medium flows via P and T-1 to port A. Because volume V-2 cannot exit through non-return valve T-2, back pressure is created. As a result pressure is also created in the pump and volume V-1. This pressure also occurs in the broken line connection C to non-return valve T-2. Owing to this pressure a small so-called drive piston (not shown in the figure) can open the valve on the basis of the correct area ratios between the valve on the one hand and the piston on the other, and suddenly the way is clear for the volume V-2. This can now flow through non-return valve T-2 via R to the tank of the pump, and the plunger/piston will hereby be able to open the spreading arms. As soon as this developed pressure drops away again, non-return valve T-2 closes again automatically and the spreading arms can no longer move.

In position 2 of valve K-6 (not shown) the reverse occurs; this time pressure is created in the broken line control pressure conduit D and non-return valve T-1 is pressed open.

Shown in schematic manner in FIGS. 3A-3D is a preferred embodiment of a rescue tool provided with a combination of a speed adjustment functionality and a blocking functionality according to the invention. Added in this diagram are a number of components which provide for an increase in the speed during spreading of the unloaded spreading arms. As soon as pressure is developed, the valve is switched off fully automatically so that the plunger/piston can produce the maximum effective force. The pressure-controlled non-return valves, which hold the load if the pressure drops away unexpectedly, are furthermore still fully functional.

In the present hydraulic diagram an additional valve K-7 is added as well as two additional non-return valves T-3 and T-4. Valve K-7 is a two-position three-way valve switched by a small control cylinder E and pressure via control pressure channel F. The valve returns to the rest position due to a spring with a determined force.

Figure 3B:
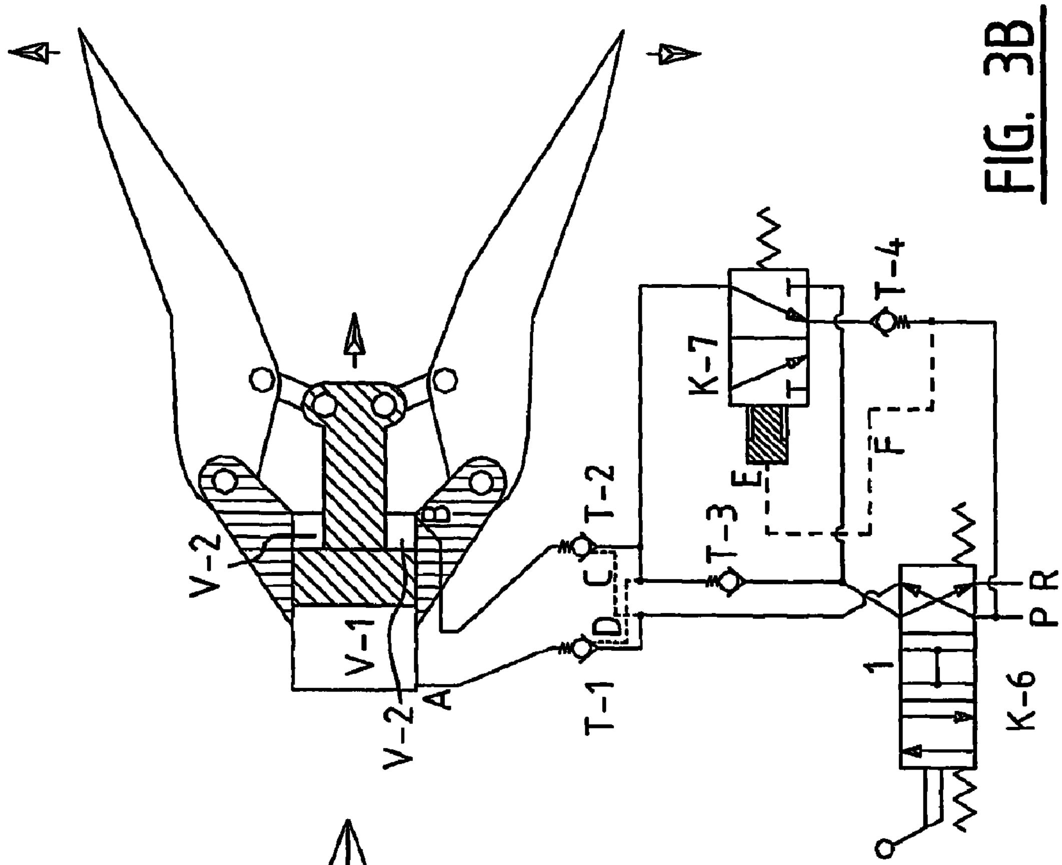
FIG. 3B is a schematic representation of the preferred embodiment of FIG. 2A in a situation where the spreading arms move outward at increased speed (spread position)
Figure 3A:
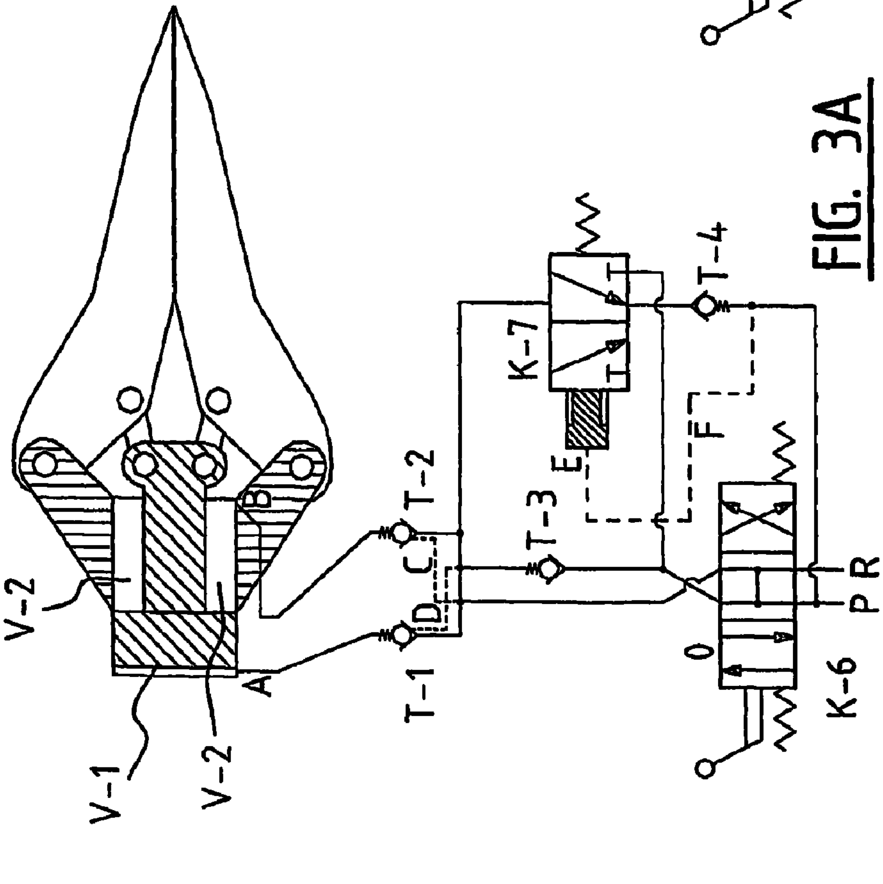
FIG. 3A is a schematic representation of a rescue tool with a hydraulic valve system according to a preferred embodiment of the invention in the neutral position (0-position)

In the 0-position as shown in FIG. 3A the pressure medium can flow via P and non-return valve T-3 and T-2 to port B of the cylinder and also reaches T-4 and K-7. The volume V-1 cannot exit however because non-return valve T-1 is closed. The plunger/piston will therefore not move and the liquid flow at P will thus choose the path of least resistance and flow via port R back to the pump.

FIG. 3B shows what happens when valve K-6 is switched on (position 1) in order for instance to spread apart a load. The pressure medium now flows via P and T-1 to port A. The pressure medium can also flow to T-4 but this valve is closed from this direction. Because volume V-2 cannot exit through non-return valve T-2, back pressure is created. As a result pressure is also created in the pump and volume V-1. This pressure also occurs in the broken line connection C to non-return valve T-2. Owing to this pressure a small so-called drive piston (only shown schematically in the figure) can open the valve on the basis of the correct surface ratios between the valve on the one hand and the piston on the other, and suddenly the way is clear for the volume V-2. This can now flow through non-return valve T-2 and valve K-7 back to P and join the volume being supplied at P. The plunger/piston will thus open the spreading arms. As soon as the built-up pressure drops away again when valve K-6 for instance is again placed in the 0-position, non-return valve T-1 and T-1 close automatically again and the spreading arms can no longer move.

Figure 3D:
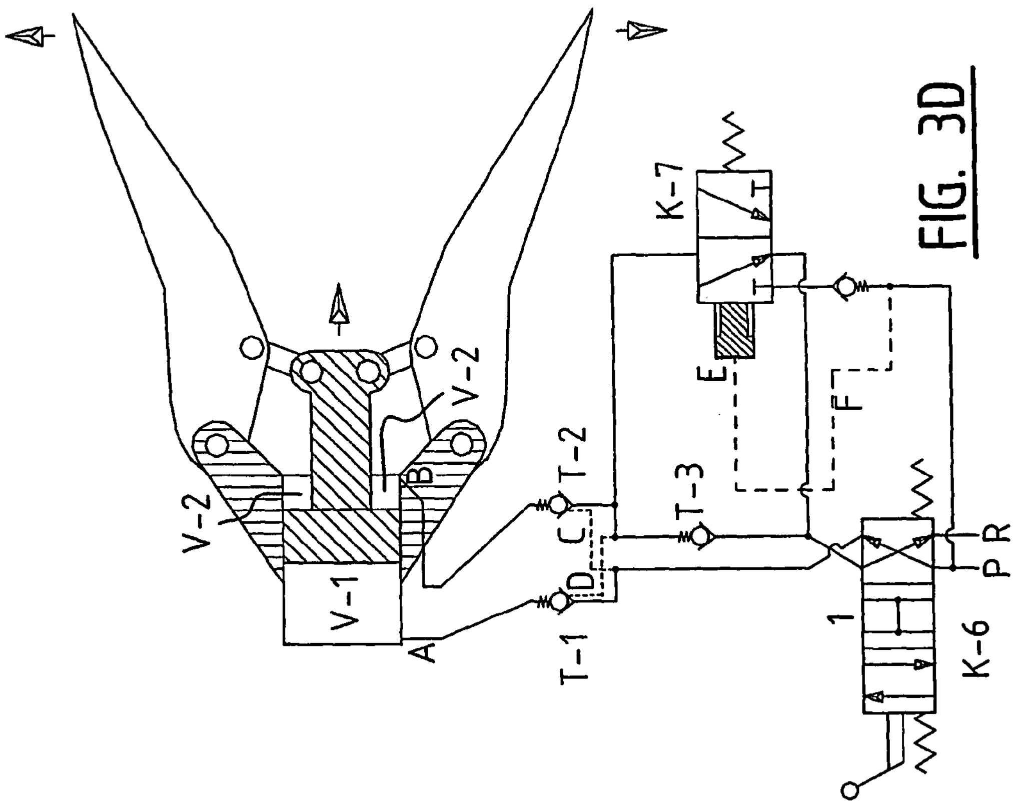
FIG. 3D is a schematic representation of the preferred embodiment of FIG. 2A in a situation where the spreading arms move outward at normal speed (spread position).

As soon as a determined back pressure has been reached in this operating position because the spreading arms must for instance displace a load, pressure occurs in the pump volume V-1 and in the control pressure conduit F. Depending on the spring pressure of valve K-7, drive piston E will place valve K-7 in the other position as shown in FIG. 3D. The volume V-2 now no longer flows via T-4 to port P but can now flow freely via valve K-6 to port R. The plunger/piston now moves only with the pump volume, so the normal speed, and can produce the maximum force on the basis of the whole surface area of the plunger/piston.

As soon as the control is placed once again in the 0-position, the feed of the oil flow to the piston stops and the movement of the plunger/piston stops.

Figure 3C:
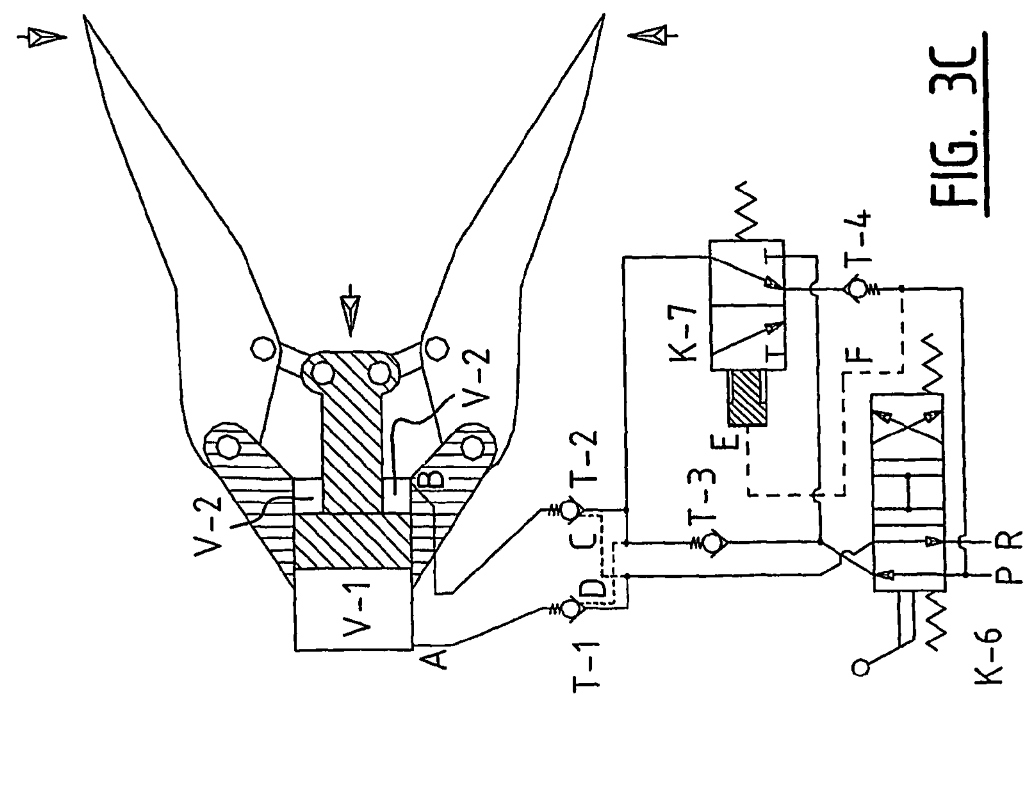
FIG. 3C is a schematic representation of the preferred embodiment of FIG. 2A in a situation where the spreading arms move inward.

As soon as the control is activated and valve K-6 is placed in position 2 as shown in FIG. 3C, the connection to the tank of the pump is closed again and the medium therefore flows from port P via T-3 and T-2 to the cylinder, and the plunger/piston will want to move as a result of the volume added to V-2. As a result pressure is created in the pump and in the cylinder at volume V-2.

This pressure also occurs in the broken line connection D to non-return valve T-1. Owing to this pressure a small so-called drive piston (only shown schematically in the figure) can open the valve on the basis of the correct area ratios between the valve on the one hand and the piston on the other, and suddenly the way is clear for the volume V-1. This volume can now flow via valve K-6 to port R, and from here to the tank of the pump.

By making use of a valve (K-7) switched by pressure it is thus possible to ensure that the speed increase only operates when the tool is used when substantially non-loaded. As soon as force is required a determined pressure is created which then switches off the valve (K-7) until the pressure drops again.

By integrating this valve into an existing control valve in a preferred embodiment a tool is created which effectively uses the volume of the pump together with the volume of the other side of the plunger/piston without the user having to acquire another, larger pump.

The invention is not limited to the preferred embodiment thereof described herein. The rights sought are rather defined by the following claims, within the scope of which many modifications can be envisaged.

What is claimed is:

1. A hydraulic rescue tool, having pivot able parts and a hydraulic valve system having a double-action hydraulic cylinder connected thereto for driving the pivotable parts, wherein the hydraulic valve system comprises:

a feed of hydraulic pressure medium;

a discharge of hydraulic pressure medium;

a first pressure conduit connected to a first chamber of the hydraulic cylinder and provided with a first pressure-controlled non-return valve;

a second pressure conduit connected to the second chamber of the hydraulic cylinder and provided with a second pressure-controlled non-return valve;

a switch for switching between a connection of the first and second pressure conduit to respectively the feed and the discharge and a connection of the first and second pressure conduit to respectively the discharge and feed;

wherein first and second pressure-controlled non-return valves block a plunger of the double-action cylinder when hydraulic pressure is lost, wherein the first and second pressure-controlled non-return valves combined with a differential valve element provide an increased speed of an outward plunger stroke of the double-action cylinder in a first position and provides a normal speed thereof in a second position, and wherein the differential valve element comprises a two-position three-way valve;

a third non-return valve arranged in a pressure conduit between the switch and the pressure-controlled non-return valve connected to the second chamber, the third non-return valve blocking flow of fluid from the second chamber to the switch; and a fourth non-return valve arranged in a pressure conduit between the feed and the differential valve element, the fourth non-return valve blocking flow of fluid from the feed to the differential valve element.

2. The hydraulic rescue tool of claim 1, wherein the differential valve element is automatically switched on by pressure.

3. The hydraulic rescue tool of claim 1, wherein a pressure-controlled non-return valve comprises a spring urging the valve to a closed position under a predetermined spring tension and a driver urging the valve to an open position subject to a preset pressure.

4. The hydraulic rescue tool of claim 3, wherein the driver comprises:

a connecting line between a pressure conduit and a non-return valve in another pressure conduit; and an operating element which is adapted to open the non-return valve in the other pressure conduit subject to the pressure in the pressure conduit.

5. The hydraulic rescue tool of claim 1, further comprising an actuator with which the differential valve element can be actuated, the actuator comprising:

a control pressure conduit connected to the feed; and an actuating element which is connected to the control pressure conduit and with which the differential valve element can be placed in the first or second position subject to the pressure in the feed, and thereby increasing the speed of the outward plunger stroke only in the case of substantially non-loaded use.

6. The hydraulic rescue tool of claim 5, wherein the actuating element comprises a control cylinder.

7. The hydraulic rescue tool of claim 1, wherein the tool is a hydraulic spreader, the pivotable parts of which are formed by spreading arms.

8. The hydraulic rescue tool of claim 1, wherein the differential valve element is integrated with the switch.

9. The hydraulic rescue tool of claim 1, further comprising:

a feed of hydraulic pressure medium;

a discharge of hydraulic pressure medium;

a first pressure conduit connected to a first chamber of the hydraulic cylinder and provided with a first pressure-controlled non-return valve;

a second pressure conduit connected to the second chamber of the hydraulic cylinder and provided with a second pressure-controlled non-return valve; and a switch capable of switching between a connection of the first and second pressure conduit to respectively the feed and the discharge and a connection of the first and second pressure conduit to respectively the discharge and feed.

10. The hydraulic rescue tool of claim 9, wherein the switch comprises a three-position four-way valve, wherein the four-way valve is adapted to provide, in a neutral position, an open connection of the pressure conduits to the feed and discharge, to provide in a second position a connection of the first and second pressure conduit to respectively the feed and the discharge, and to provide in a third position a connection of the first and second pressure conduit to respectively the discharge and feed.

11. The hydraulic rescue tool of claim 10, wherein the four-way valve comprises a spring urging the three-position four-way valve into the neutral position under spring tension.

* * * * *